Patented June 16, 1936

2,044,639

UNITED STATES PATENT OFFICE 2,044,639

PROCESS OF PACKAGING NUT MEATS

Julius L. Schneider, Chicago, Ill., assignor to Continental Can Company, Inc., New York, N. Y., a corporation of New York No Drawing. Application June 17, 1932, Serial No. 617,919

2 Claims. (Cl. 99—8)

The invention relates to new and useful improvements in the process of packaging nut meats in hermetically sealed containers.

An object of the invention is to treat the nut meats prior to the placing of the same in an hermetically sealed container so as to render substantially inactive those enzymes which normally aid in the production of a sour fermentation in the nut meat.

A further object of the invention is to provide a process of treating nut meats prior to the packaging of the same in hermetically sealed containers which will prevent rancidity of the nut oils during storage.

A still further object of the invention is to provide a process of treating nut meats whereby the oxygen content within the cells or cellular spaces of the nut meats is withdrawn prior to the packaging of the nut meats in the containers, and whereby the nut meats are packed in an atmosphere free from oxygen gas, so that sour fermentation and rancidity in the nut meats is prevented.

It has been well known that the oxygen in the air causes a sour fermentation and rancidity of the oils in nut meats. Efforts have been made to package nut meats in sealed containers in an atmosphere substantially free from oxygen gas. This has been accomplished by placing the container for the nut meats under vacuum at the time of sealing of the package. Such a treatment of the nut meats does not altogether prevent sour fermentation and rancidity of the oils. I have found that there is contained in the cells or cellular spaces of the raw nut meats, large quantities of gas which are believed to consist largely of carbon dioxide. This gas results from the normal respiratory processes whereby oxygen gas is consumed and carbon dioxide gas is evolved. In order that the respiratory process may be carried out normally, it is necessary that oxygen, free or in the form of unstable peroxide-like bodies, be immediately available to the nut meat cells. There is, therefore, associated with the carbon dioxide gas in the cells or cellular spaces, a considerable amount of readily available oxygen. It is this oxygen which renders active the enzymes which aid in the production of a sour fermentation, and which also result in the rancidity of the nut oils.

The present invention has to do with a process whereby the oxygen within the cells or cellular spaces of the nut meats is removed. Preferably, this is accomplished by placing the nut meats in bulk in a chamber which is sealed and connected to a continuous source of high vacuum. The nut meats are subjected to this vacuum treatment for a considerable period of time, from one to three hours or more. After such treatment, the nut meats are found to contain practically no oxygen either free or in the form of unstable peroxide-like bodies. The cell walls partially collapse when the vacuum is released, and air or other gases do not easily re-enter the nut meats. Therefore, if the nut meats are exposed to the atmosphere after being treated so as to withdraw the gases therefrom, they will not readily deteriorate. It is preferable, however, to relieve the vacuum with an inert gas such as nitrogen gas, especially where the nut meats are not immediately sealed in containers. The nut meats after treatment in bulk are placed in containers and sealed therein in an atmosphere substantially free from oxygen gas. This may be accomplished by placing the container under vacuum, thus withdrawing the oxygen content of the air from the container before sealing. Preferably, however, the nut meats are packed in an inert atmosphere, such as nitrogen gas.

By my process of treating nut meats, the amount of oxygen available to the nut meats is substantially zero, and as noted, those enzymes which normally aid in the production of a sour fermentation do not function, nor does rancidification of the nut oils take place. The nut meats are kept sweet and fresh with little or no apparent deterioration. Furthermore, where sour fermentation is prevented the original color of the nut meats is preserved.

It is obvious that minor changes in the details of the steps of the process and the time which the nut meats are subjected to the vacuum may be made without departing from the spirit of the invention as set forth in the appended claims.

Having thus described the invention, what I claim as new and desire to secure by Letters Patent, is:

1. Process of packaging nut meats consisting in placing the shelled nut meats in a chamber in bulk and subjecting said nut meats to a high vacuum from one to three hours or more to remove substantially all of the gases from the cells or cellular spaces of the nut meats, relieving the vacuum with an inert gas, and subsequently removing the nut meats from said chamber and immediately sealing the same in metal containers in an atmosphere substantially free from oxygen.

2. Process of packaging nut meats consisting in placing the shelled nut meats in a chamber in bulk and subjecting said nut meats to a high vacuum for a period of time sufficient to remove substantially all of the gases from the cells or cellular spaces of the nut meats, relieving the vacuum with an inert gas for restoring said nut meats to substantially normal condition, and subsequently removing the nut meats from said chamber and immediately sealing the same in metal containers in an atmosphere substantially free from oxygen.

JULIUS L. SCHNEIDER.